P. J. SMOLA.
AUTOMATIC BRAKE.
APPLICATION FILED APR. 14, 1914.
1,125,753.
Patented Jan. 19, 1915.
2 SHEETS—SHEET 2.
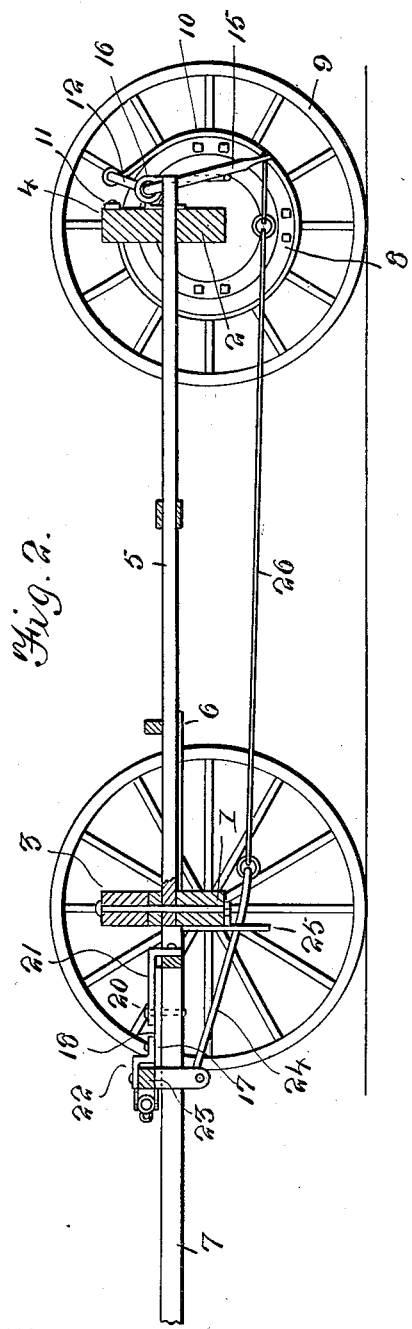
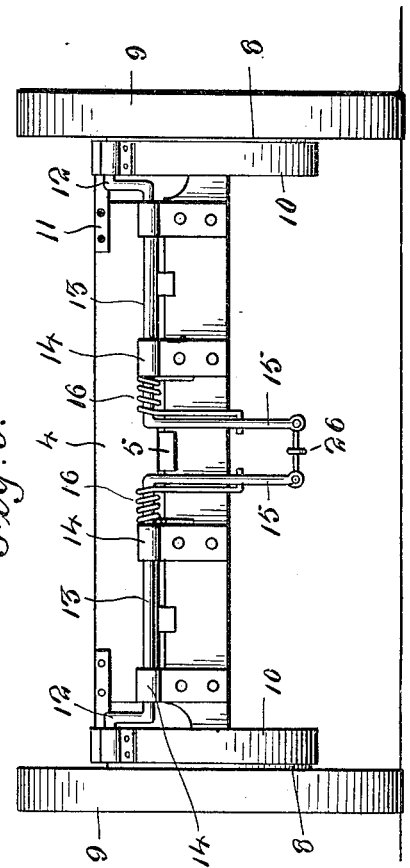
Witnesses
E. R. Ruppert
V. B. Hillyard
Inventor
P. J. Smola
By Victor J. Evans
Attorney

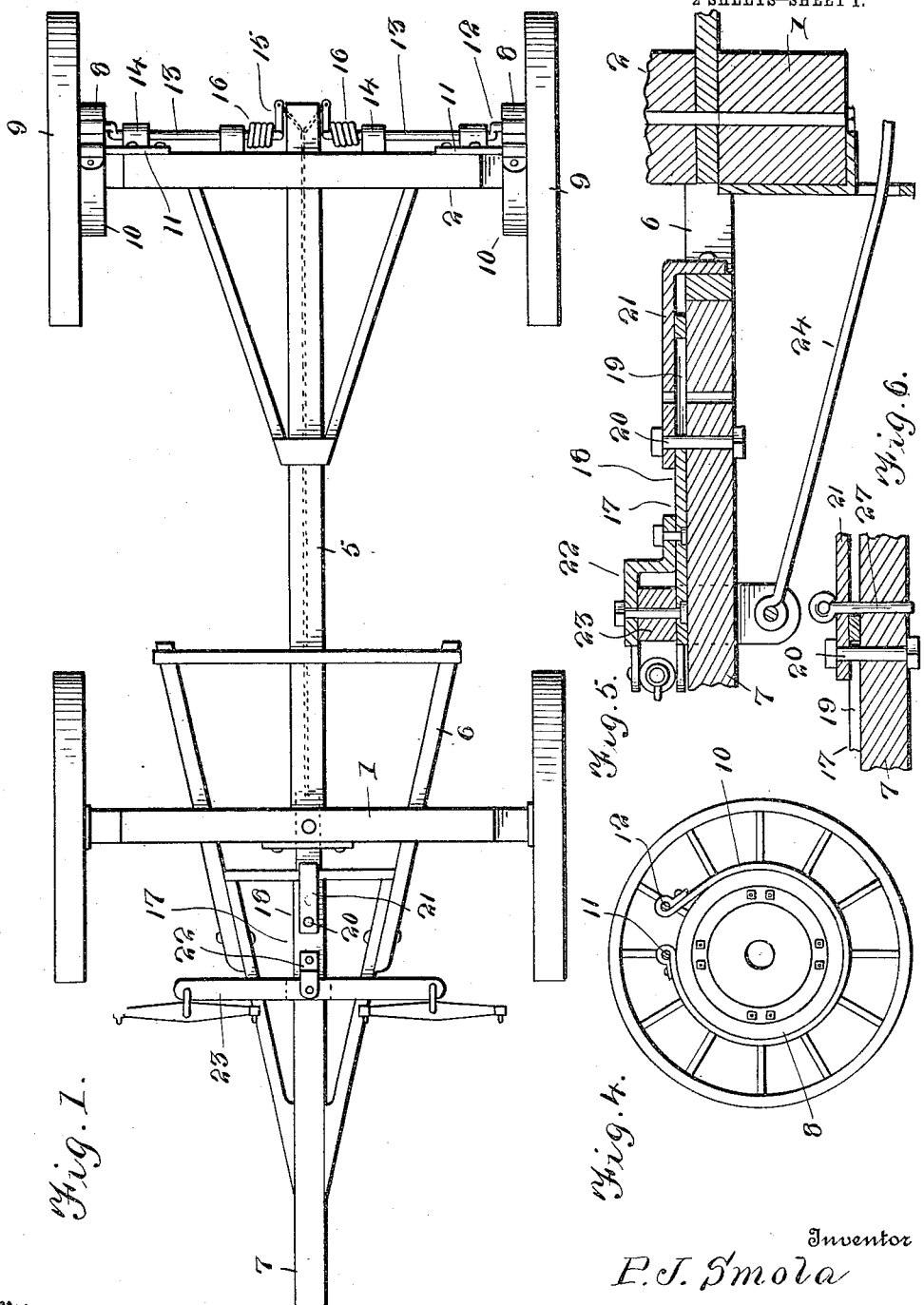

UNITED STATES PATENT OFFICE.

PAUL J. SMOLA, OF EDWARDSVILLE, ILLINOIS.

AUTOMATIC BRAKE.

1,125,753.   Specification of Letters Patent.   Patented Jan. 19, 1915.

Application filed April 14, 1914. Serial No. 831,809.

*To all whom it may concern:*

Be it known that I, PAUL J. SMOLA, a citizen of the United States, residing at Edwardsville, in the county of Madison and State of Illinois, have invented new and useful Improvements in Automatic Brakes, of which the following is a specification.

The invention relates to vehicle brakes and more particularly to the type which are automatically in action thereby preventing the vehicle from running upon the team when descending grade.

The invention provides a vehicle brake which normally is set and which is released when the draft is applied for drawing the vehicle forward and as a result the brake is automatically applied when the draft ceases to be applied.

A further purpose of the invention is the provision of an automatic brake which admits of the vehicle being backed and which further provides for holding the brake out of action under all conditions.

The invention furthermore has for its object to provide an automatic brake which may be readily applied to vehicles already constructed or in use, since it is not necessary to change any material part of the vehicle or running gear when installing the brake mechanism.

The invention consists of the novel features, details of construction and combination of parts, which hereinafter will be more particularly set forth, illustrated and claimed.

In the drawings hereto attached:—Figure 1 is a top plan view of the running gear of a wagon provided with automatic brake mechanism embodying the invention. Fig. 2 is a central longitudinal section. Fig. 3 is a rear view. Fig. 4 is a detail view of one of the rear wheels showing the brake drum and brake band coöperating therewith. Fig. 5 is a detail view of the parts applied to the front axle and tongue. Fig. 6 is a detail view of a portion of the pole, slide and rear strap showing the pin in position for preventing rearward movement of the slide, when it is required to hold the brakes released.

Corresponding and like parts are referred to in the following description, and indicated in all the views of the drawing, by the same reference characters.

The brake mechanism is shown applied to a vehicle running gear of the type embodying front and rear axles 1 and 2, front and rear bolsters 3 and 4, a reach 5 and hounds 6 having king bolt connection with the front axle and bolster and reach 5, said hounds having a pole or tongue 7 pivotally connected thereto in the usual manner.

A brake drum 8 is bolted or otherwise secured to the spokes of each of the rear wheels 9 and a brake band is arranged to coöperate therewith, one end of such brake band being attached to an arm 11 projecting from the rear bolster 4 and the other end being connected to a crank 12 at the outer end of a shaft 13 which is mounted in brackets 14 secured to the rear axle 2. The inner end of each of the shafts 13 has an arm 15 which preferably extends downwardly. A spring 16 normally exerts a pressure to hold the brake set. The spring 16 is of the coil type and has one end in engagement with the rear axle 2 and its opposite end in engagement with the arm 15. The inner ends of the shafts 13 terminate a short distance from a central point of the bolster 4, hence the arms 15 come close together. When the vehicle is drawn forward by the team the draft so exerted is utilized in part for overcoming the tension of the springs 16 and moving the shafts 13 to release the brake drum 8 from the gripping action of the brake drum 10, but when the draft of the team is released from any cause the springs 16 come into play and automatically apply the brakes. Any forward tendency of the vehicle is resisted by the brakes whereas the vehicle may be backed since a backward rotation of the rear wheels 9 tends to release the brake bands. It will thus be understood that when descending a grade the vehicle is prevented from running upon the team by the action of the brakes which are automatically set in the manner stated.

A slide 17 is mounted upon the rear end of the pole or tongue 7 and is formed with a rearwardly extending member 18 in which is formed a longitudinal slot 19 to receive a bolt 20 which connects the front end of a strap 21 with the pole, the rear end of such strap being bent and secured to the rear end of such pole. A hammer strap 22 connects the whiffletree 23 with the member 18. The whiffletree moves with the slide 17 and is drawn forward by the team and tends to move rearwardly when the vehicle advances without being drawn forward by the team as when descending grade. A bar 24 is attached at its front end to the slide 17 and passes through a guide 25 attached centrally to the front axle 1. A connection 26 joins the rear end of the bar 24 with the lower ends of the arm 15 and such connection may consist of a chain, cable or analogous part.

When the vehicle is drawn forward by the draft of the team in the usual manner the slide 17 is advanced and exerts a pulling force on the connection 26 which in turn moves the shafts 13 in their bearings against the tension of the springs 16 thereby releasing the brakes. But, however, when the draft is relaxed for any cause as when the vehicle is descending grade or is left standing the springs 16 come into play and automatically set the brakes in the manner described. When the brakes are set the vehicle may be backed because a reverse movement of the rear wheels effects a release of the brakes in the manner stated. A pin 27 is adapted to be passed through parts 7 and 21 in the rear of the slide 17 to prevent rearward movement thereof when the draft is released, thereby holding the brakes out of action.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed.

Having thus described the invention, what is claimed as new is:—

In an automatic vehicle brake, the combination of a brake, a spring normally exerting a pressure to hold the brake applied, a slide adapted to have the draft applied thereto for releasing the brake, connecting means between the slide and brake, such slide having a longitudinal slot, a strap extending over the rear portion of the slide and secured to the supporting means of the slide, a bolt connecting such strap with the slide support and passing through the longitudinal slot of the slide, and a fastening adapted to pass through the strap and slide support and engage the slide to hold the brake out of action.

In testimony whereof I affix my signature in presence of two witnesses.

PAUL J. SMOLA.

Witnesses:
W. H. BRENNAN,
H. M. HILLS.

Copies of this patent may be obtained for five cents each, by addressing the "Commissioner of Patents, Washington, D. C."